United States Patent
Nielsen et al.

(10) Patent No.: US 9,695,518 B2
(45) Date of Patent: *Jul. 4, 2017

(54) SEALING GLASS FOR SOLID OXIDE ELECTROLYSIS CELL (SOEC) STACKS

(75) Inventors: Jens Ulrik Nielsen, Søborg (DK); Jørgen Gutzon Larsen, Bagsværd (DK)

(73) Assignee: Haldor Topsoe A/S, Lyngby (DK)

( * ) Notice: Subject to any disclaimer, the term of this patent is extended or adjusted under 35 U.S.C. 154(b) by 725 days.

This patent is subject to a terminal disclaimer.

(21) Appl. No.: 13/499,925

(22) PCT Filed: Oct. 5, 2010

(86) PCT No.: PCT/EP2010/006058
§ 371 (c)(1),
(2), (4) Date: Apr. 3, 2012

(87) PCT Pub. No.: WO2011/042148
PCT Pub. Date: Apr. 14, 2011

(65) Prior Publication Data
US 2012/0193223 A1  Aug. 2, 2012

(30) Foreign Application Priority Data
Oct. 6, 2009  (DK) .................. 2009 01093

(51) Int. Cl.
*C25B 9/18* (2006.01)
*C03C 13/00* (2006.01)
(Continued)

(52) U.S. Cl.
CPC ............. *C25B 9/18* (2013.01); *C03C 13/00* (2013.01); *C03C 13/006* (2013.01);
(Continued)

(58) Field of Classification Search
CPC ............. C25B 1/10; C25B 9/06–9/10; C25B 9/18–9/206; H01M 8/10–8/1286;
(Continued)

(56) References Cited

U.S. PATENT DOCUMENTS 5,585,203 A   12/1996  Chikagawa et al.
7,022,634 B2   4/2006  Hamilton et al.
(Continued)

FOREIGN PATENT DOCUMENTS

CN  1746252 A  3/2006
CN  101292382 A  10/2008
(Continued)

OTHER PUBLICATIONS

V. K. Marghussian et al., "Effects of Cr2O3 on Nucleation of SiO2—Al2O3—CaO—MgO—(R2O, Fe2O3, TiO2) Glass Cermaics," Phys. Chem. Glasses, vol. 39, No. 4, 1998, pp. 246-251.
(Continued)

*Primary Examiner* — Ciel Thomas
(74) *Attorney, Agent, or Firm* — Blank Rome LLP

(57) ABSTRACT

Solid oxide electrolysis cell (SOEC) stack obtainable by a process comprising the use of a glass sealant with composition 50 to 70 wt % $SiO_2$, 0 to 20 wt % $Al_2O_3$, 10 to 50 wt % CaO, 0 to 10 wt % MgO, 0 to 2 wt % ($Na_2o$ $1K_2O$), 0 to 10 wt % $b_2O_3$, and 0 to 5 wt % of functional elements selected from $TiO_2$, $ZrO_2$, $ZrO_2$, F, $P_2O_5$, $MoO_3$, $FeO_3$, $MnO_2$, La—Sr—Mn—O perovskite (LSM) and combinations thereof. Preferably, the sealant is a sheet of E-glass fibers with a composition in wt % of 52-56 $SiO_2$, 12-16 $Al_2O_3$, 16-25 CaO, 0-6 MgO, 0-2 $Na_2+K_2O$, 0-10 $B_2O_3$, 0-1.5 $TiO_2$, O-1F.

4 Claims, 1 Drawing Sheet

(51) Int. Cl.
*C04B 37/02* (2006.01)
*H01M 8/0282* (2016.01)

(52) U.S. Cl.
CPC ........ *C04B 37/025* (2013.01); *C04B 2237/10* (2013.01); *C04B 2237/348* (2013.01); *C04B 2237/40* (2013.01); *H01M 8/0282* (2013.01)

(58) Field of Classification Search
CPC ...... H01M 8/0282; C03C 13/00; C03C 13/06; C04B 37/025; C04B 2237/10; C04B 2237/348; C04B 2237/40
See application file for complete search history.

(56) References Cited

U.S. PATENT DOCUMENTS

| | | | |
|---|---|---|---|
| 8,163,436 B2 * | 4/2012 | Larsen et al. | 429/469 |
| 8,497,047 B2 * | 7/2013 | Larsen et al. | 429/469 |
| 2008/0032178 A1 * | 2/2008 | Diep et al. | 429/35 |
| 2008/0142148 A1 * | 6/2008 | Nielsen | C03C 8/24 156/89.12 |
| 2008/0227615 A1 * | 9/2008 | McGinnis et al. | 501/38 |
| 2009/0253017 A1 * | 10/2009 | Larsen et al. | 429/33 |
| 2010/0086825 A1 * | 4/2010 | Lamberson et al. | 429/33 |

FOREIGN PATENT DOCUMENTS

| | | |
|---|---|---|
| CN | 101506117 A | 8/2009 |
| CN | 101557007 A | 10/2009 |
| CN | 101841052 A | 9/2010 |
| DK | EP 2104172 A1 * | 9/2009 .......... H01M 8/0282 |
| EP | 2 104 172 A1 | 9/2009 |
| EP | 2 109 173 A2 | 10/2009 |
| EP | 2 228 858 A1 | 9/2010 |
| RU | 2323506 C2 | 4/2008 |
| WO | WO 2004/038844 A1 | 5/2004 |
| WO | WO 2008/112978 A1 | 9/2008 |

OTHER PUBLICATIONS

H.-J. Illig et al., "ABC Glas", 2nd edition, 1991, p. 59, ISBN 3-342-00433-9.

* cited by examiner

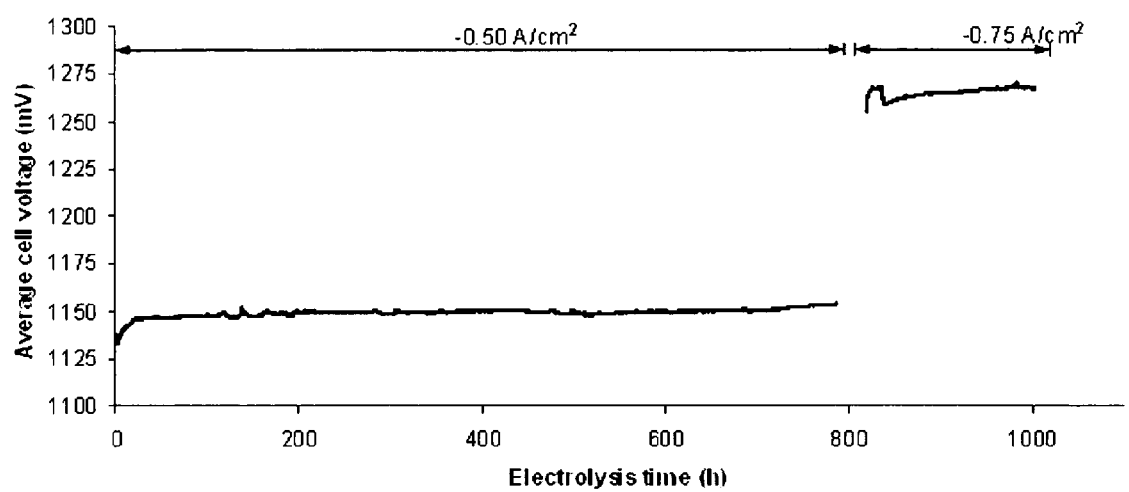

SEALING GLASS FOR SOLID OXIDE ELECTROLYSIS CELL (SOEC) STACKS

The present invention concerns a process for preparing a Solid Oxide Electrolysis Cell (SOEC) stack in which the electrolyser cell units and interconnect plates making up the stack are provided with a glass sealant having a TEC significantly lower than the rest of the electrolysis cell stack prior to operation. The glass sealant is provided as a thin sheet of paste or glass fibres having a composition within the system comprising $CaO$—$MgO$—$SiO_2$—$Al_2O_3$—$B_2O_3$. More specifically, the invention concerns a solid oxide electrolysis cell stack obtainable by a process comprising the use of a glass sealant with a composition of 50 to 70 wt % $SiO_2$, 0 to 20 wt % $Al_2O_3$, 10 to 50 wt % CaO, 0 to 10 wt % MgO, 0 to 2 wt % ($Na_2O+K_2O$), 0 to 10 wt % $B_2O_3$, and 0 to 5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof. The glass sealant is preferably a thin sheet of glass fibres in the form of E-glass.

An SOEC comprises an oxygen-ion conducting electrolyte, an electrode where oxygen is formed by reduction of $O^{2-}$ supplied by the electrolyte and an electrode where hydrogen is released from steam by decomposition of water according to the reaction: $2e^- + H_2O \rightarrow H_2 + O^{2-}$. The $O^{2-}$ is taken up in vacancies of the electrolyte and driven to the positive side of the electrolyte where its charge is removed by the positive electrode and $O_2$ is released. Instead of steam it is possible to consume $CO_2$ in which case the product is CO. The energy required to drive the reaction is supplied as electrical energy by passing a current through the cell. The overall result is that electricity and steam are used to produce oxygen and hydrogen. In the case with $CO_2$ supply, the overall result is that electricity and $CO_2$ are used to produce oxygen and CO.

The operation temperature of an SOEC is in the range 650 to 950° C., often 700 to 850° C. An SOEC requires in ordinary operation a voltage of about 1.4V. SOEC cells are assembled in stacks in which the cells are electrically connected via interconnector plates.

Typically, such electrolyser cells are composed of Y-stabilized zirconia (YSZ) electrolyte together with cathode and anode electrodes and contact layers to the electron conducting interconnect plate. The interconnect is usually provided with gas (e.g. steam) supply channels for the electrolyser cell and separates the gases on either side of the cells and also establishes the series connection between the cells. Gas-tight sealants are usually also provided to avoid the mixing of the produced hydrogen and oxygen from either side of the cell and they provide also for the proper bonding of the electrolyser cell units with the interconnector plates. The sealants are thus vitally important to the performance, the durability and the safe operation of the electrolyser cell stacks. The sealant must be inert to corrosion in order to avoid Si-poisoning on the reducing side of the cells.

During operation the SOEC is subjected to thermal cycling and may thereby be exposed to tensile stress. If the tensile stress exceeds the tensile strength of the fuel cell, it cracks, and the whole SOEC stack suffers from a malfunction.

One source of tensile stress in the SOEC arises from the discrepancies between the thermal expansion coefficients (TEC) of the cell stack components. The high operating temperature and thermal cycling of an SOEC stack require that the interconnect plates are made of materials which have a TEC similar to that of the fuel cell units. Today it is possible to find suitable materials for interconnect plates which have substantially the same TEC as the cells.

Another source of tensile stress which is difficult to avoid results from the discrepancy in TEC of the sealant, often a glass sealant with respect to the interconnect plates and the cells in the SOEC stack. It is usually recognized that the thermal expansion coefficient (TEC) of the sealant should be in the range 11 to $13 \cdot 10^{-6} K^{-1}$ (25 to 900° C.), thus corresponding to the TEC of the interconnector plate and/or the electrolyser cell in order to eliminate crack formation in the electrolyser cell components. Furthermore, the sealing material has to be stable over a time span of say 40.000 h without reacting with the other materials and/or ambient gasses.

A common material used in gas-tight sealants is glass of varying compositions, and much work has been concentrated on development of suitable glass compositions:

Our EP-A-1,010,675 describes a number of glass sealing materials suitable for solid oxide fuel cells (SOFC), including alkaline oxide silicate glasses, mica glass ceramics, alkaline-earth oxide borosilicate/silicaborate glasses and alkaline-earth alumina silicates. This citation teaches the preparation of a glass sealing material based on dried glass powder and a filler material. The TEC of the glass powder may be as low as $7.5 \cdot 10^{-6} K^{-1}$, and accordingly filler material is added to increase the TEC in the final glass powder so that it substantially matches that of the interconnector plates and fuel cell units having TEC of 9 to $13 \cdot 10^{-6} K^{-1}$.

EP-A-1,200,371 describes a glass-ceramic composition for solid oxide fuel cells which is provided as a blend of $Al_2O_3$, BaO, CaO, SrO, $B_2O_3$ and $SiO_2$ within specific ranges. The glass and crystallized (after heat treatment) glass-ceramic show TEC ranging from $7 \cdot 10^{-6} K^{-1}$ to $13 \cdot 10^{-6} K^{-1}$. However, a considerable amount of BaO is required in the glass ceramic composition to obtain the high TEC. Prior to heat treatment the TEC of the glass-ceramic substantially matches that of the other solid ceramic components (within 30%).

S. Taniguchi et al. Journal of Power Sources 90 (2000) 163-169 describes the use of a silica/alumina (52 wt % $SiO_2$, 48 wt % $Al_2O_3$; FIBERFRAX® FFX paper #300, Toshiba Monofrax, thickness 0.35 mm) and ceramic fiber as sealing material in solid oxide fuel cells. This sealant is able to suppress electrolyte-cracks in the fuel cell, but the sealant properties are insufficient as gas leakage is detected near the sealing material.

US-A-2003/0203267 discloses the use of multilayer seals in electrochemical devices, particularly solid oxide fuel cells including the use of a glass material containing 58% $SiO_2$, about 9% $B_2O_3$, about 11% $Na_2O$, about 6% $Al_2O_3$, about 4% BaO, and ZnO, CaO and $K_2O$.

EP-A-2,104,171 discloses a sealing composition, viz. a composite glass seal for a solid cell stacks comprising glass particles coated with particles of a ceramic and/or metallic material.

EP-A-2,104,172 discloses a composite glass seal for a solid electrolyser cell stack. Between the interconnects and the single cells a glass seal is provided. The seal comprises a glass component and a component comprising a metal oxide or metal oxide precursor. The latter is located between the glass component and a gas passageway in order to provide a barrier that gives protection against the diffusion of volatile species to the cell components. The sealing component is applied by screen printing and it may also be applied as glass bars, fibres and woven or non-woven glass cloths.

It is an object of the present invention to provide a solid oxide electrolyser cell stack containing a gas-tight sealant which does not initiate cracking in the cells, which has a low reactivity with other cell stack components and thereby shows at low extend of degradation during operation.

It is another object of the invention to provide a solid oxide electrolysis cell stack containing a gas-tight sealant which enables a very fast production of the stacks with an improved thickness tolerance of the sealant across the stack.

It is yet another object of the invention to provide a solid oxide electrolysis cell stack containing a gas-tight sealant which enables a low electrical conductivity at the operation temperature of the stack.

These and other objects are solved by the invention.

Accordingly, we provide a solid oxide electrolysis cell (SOEC) stack obtainable by a process comprising the steps of: (a) forming a first cell stack assembly by alternating at least one interconnector plate with at least one cell unit, in which each cell unit comprises a first electrode, a second electrode and an electrolyte arranged between these electrodes, and providing a glass sealant between the interconnector plate and each cell unit, in which the glass sealant has the composition:
50 to 70 wt % $SiO_2$, 0 to 20 wt % $Al_2O_3$, 10 to 50 wt % CaO, 0 to 10 wt % MgO, 0 to 2 wt % ($Na_2O+K_2O$), 0 to 10 wt % $B_2O_3$, and 0 to 5 wt % of functional elements selected from $TiO_2$, $ZrO_2$, $F_2$, $P_2O_5$, $MoO_3$, $Fe_2O_3$, $MnO_2$, La—Sr—Mn—O perovskite (LSM) and combinations thereof;
(b) converting said first cell stack assembly into a second assembly having a glass sealant of a thickness of 5 to 100 μm by heating said first assembly to a temperature of 500° C. or higher and subjecting the cell stack to a load pressure of 2 to 20 kg/cm$^2$;
(c) converting said second assembly into a final solid oxide electrolysis cell stack assembly by cooling the second assembly of step (b) to a temperature below that of step (b), wherein the glass sealant in step (a) is provided as a sheet of glass fibres and wherein the sheet of glass fibres contains fibres in an amount of 70 to 100 g/m$^2$ towards the cell and 30 to 60 g/m$^2$ towards the interconnect plate.

Preferably in combination with any of the embodiments set out below, in step (b) the temperature is 800° C. or higher and the load pressure is 2 to 10 kg/cm$^2$. Hence, in a preferred embodiment we provide a solid oxide electrolysis cell stack obtainable by a process comprising the steps of:
(a) forming a first fuel cell stack assembly by alternating at least one interconnector plate with at least one cell unit, in which each cell unit comprises a first electrode, a second electrode and an electrolyte arranged between these electrodes, and providing a glass sealant between the interconnector plate and each cell unit, in which the glass sealant has the composition:
50 to 70 wt % $SiO_2$, 0 to 20 wt % $Al_2O_3$, 10 to 50 wt % CaO, 0 to 10 wt % MgO, 0 to 2 wt % ($Na_2O+K_2O$), 0 to 10 wt % $B_2O_3$, and 0 to 5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof;
(b) converting said first cell stack assembly into a second assembly having a glass sealant of a thickness of 5 to 100 μm by heating said first assembly to a temperature of 800° C. or higher and subjecting the cell stack to a load pressure of 2 to 10 kg/cm$^2$;
(c) converting said second assembly into a final cell stack assembly by cooling the second assembly of step (b) to a temperature below that of step (b),
wherein the glass sealant in step (a) is provided as a sheet of glass fibres and wherein the sheet of glass fibres contains fibres in an amount of 70 to 100 g/m$^2$ towards the cell and 30 to 60 g/m$^2$ towards the interconnect plate.

In this specification the terms "glass sealant" and "gas-tight sealant" are used interchangeably.

The term "first electrode" defines the electrode where the feed gas in form of steam ($H_2O$) or $CO_2$ is converted to $H_2$ and $O^{2-}$ and CO and $O^{2-}$, respectively.

The term "second electrode" defines the electrode where the $O_2$ is formed by oxidation of the $O^{2-}$ ions formed in the first electrode and which have passed through the electrolyte.

The stack of step (c) may for instance be cooled to room temperature. By room temperature (RT) is meant the ambient temperature at which the first fuel cell stack assembly is prepared, normally 20 to 30° C.

By heating said first fuel cell stack assembly to a temperature of 500° C. or higher, particularly 800° C. or higher, such as 850° C., 900° C., 950° C. or higher and at the same time pressing the cell stack with a load pressure (tightening pressure) of 2 to 10 kg/cm$^2$, preferably 4 to 8 kg/cm$^2$, it is possible to squeeze the sealant material so as to form a tight and dense sealant. Still, the load pressure may be higher than 10 kg/cm$^2$, for instance up to 20 kg/cm$^2$, such as 14 or 18 kg/cm$^2$. Preferably, the temperature in step (b) is in the range of 800 to 900° C. Yet, instead of heating to 800° C. or higher, lower temperatures may be used, such as temperatures in the range of 500 to 800° C., such as 550, 600, 650, 700 or 750° C. The closed porous structure thus obtained renders the sealant less susceptible to leakage. The resulting thickness of the sealant is in the range 5 to 100 μm, often 5 to 50 μm, more often 10 to 35 μm.

As used herein the term "sheet of glass fibres" defines a layer 0.05 to 10 mm, preferably 0.10 to 1.0 mm thick of glass fibres applied in step (a) and which corresponds to a 5 to 100 μm thick dense sealant layer after treatment according to the invention. The sheet of glass fibres is preferably fibre glass paper, more preferably E-glass paper such as fibre glass paper containing or loaded with fibres in an amount ranging from 20 to 200 g/m$^2$, preferably 30 to 100 g/m$^2$, such as 50 to 100 g/m$^2$ Preferably, the sheet of glass fibres contains fibres in an amount of 100 to 200 g/m$^2$ towards the cell unit and 20 to 50 or 60 g/m$^2$ towards the interconnect plate. More preferably, the sheet of glass fibres contains fibres in an amount of 70 to 100 g/m$^2$, most preferably 100 g/m$^2$ towards the cell and 30 to 60 g/m$^2$, such as 50 g/m$^2$ towards the interconnect plate corresponding to an about 40 and 20 μm thick dense sealant layer after treatment according to the invention. Most preferably, the sheet of glass fibres is E-glass paper and contains fibres in an amount of 70 to 100 g/m$^2$, such as 100 g/m$^2$ towards the cell and 30 to 60 g/m$^2$, such as 50 g/m$^2$ towards the interconnect plate corresponding to sn about 40 and 20 μm thick dense sealant layer after treatment according to the invention. More specifically, the use of for instance 80 g/m$^2$ towards the cell results in a sealant thickness of about 30 μm, and the use of 30 g/m$^2$ towards the interconnect results in a thickness of about 10 μm. By providing different thicknesses of the sheet of glass fibres towards the cell and towards the interconnect plate, a superior sealing of the resulting SOEC stack is achieved.

The provision of the sealant as a sheet of glass fibres, for instance as a gasket of glass fibres, such as E-glass fibres, results in an improved thickness tolerance compared to cell stacks in which the sealant is provided as powder. The thickness of the sealant in the final cell stack of 5 to 100 μm, preferably 5 to 50 μm, is kept within a specified narrow range such as ±5 μm. Thus, disparities in the thickness of the sealant between the cell units of the final cell stack are eliminated or at least significantly reduced compared to cell stacks in which the sealant is provided by conventional spraying or deposition of a slurry or paste prepared from e.g. powder. In contrast to sheets of E-glass fibres, pastes soften deteriorate over time and the amount supplied to the cells may vary substantially depending on the consistency of the paste. Further, the provision of the sealant in step (a) as a sheet of glass fibres allows the SOEC stack comprising the sealant to be made by simply punching commercially available E-glass fibre bands without resorting to much more expensive alternatives. Such alternatives are e.g. the implementation of processing steps connected with the production of glass powder into a slurry or a paste to form the sealant or the addition of filler material to increase the TEC of the sealant. In terms of production it is also easier to protect the interconnect plates at particularly edge regions with E-glass sheets compared to the use of pastes. A simpler and better sealing is obtained with E-glass sheets. Accordingly, manufacturing costs associated with the production of SOEC stacks are significantly reduced.

The sheet of glass fibres may be provided as chopped E-glass fibres such as commercial E-glass in the form of sheets of 0.10 to 1.0 mm, preferably 0.3-1.0 mm in thickness, corresponding to a thickness of the sealant in the final cell stack of 5 to 50 µm, often 10-40 µm, more often 10-35 µm, such as 20 µm and particularly 11-33 µm. The sheet of E-glass fibres is commercially available (e.g. E-glass of 50 to 100 g/m$^2$) and represents a simple and inexpensive solution to the problem of providing proper sealants in fuel cell stacks, i.e. sealants which during operation suppress cell cracking, which are gas-tight, which provide electrical isolation of the cell and which present a low reactivity with interconnector plates. When using the E-glass as starting glass material, this E-glass is also preferably provided as a sheet of glass fibres, such as E-glass fibre paper. Because E-glass can be delivered as rolls of glass fibres, the shape of the sealant with corresponding holes for the separate passage of e.g. steam and produced hydrogen or air and produced oxygen can be provided efficiently and expediently by simple punching methods.

In another preferred embodiment in combination with the above or below embodiments, the glass sealant has the composition: 50-65 wt % $SiO_2$, 0 to 20 wt % $Al_2O_3$, 15-40 wt % CaO, 0 to 10 wt % MgO, 0 to 2 wt % ($Na_2O+K_2O$), 0 to 10 wt % $B_2O_3$, and 0 to 5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof.

It is to be understood that the glass sealant composition may be free of $Al_2O_3$ (0 wt %), but it contains preferably up to 20 wt % $Al_2O_3$, such as 10-15 wt % $Al_2O_3$. Likewise the glass sealant composition may be free of MgO (0 wt %), but it contains preferably up to 10 wt % MgO, such as 0.5-4 wt % MgO. The glass sealant composition may be free (0 wt %) of $Na_2O+K_2O$, but it contains preferably up to 2 wt % $Na_2O+K_2O$. The glass sealant composition may be free (0 wt %) of $B_2O_3$, but it contains preferably up to 10 wt % $B_2O_3$. The glass composition may also be free (0 wt %) of functional elements selected from $TiO_2$, $ZrO_2$, $F_2$, $P_2O_5$, $MoO_3$, $Fe_2O_3$, $MnO_2$, La—Sr—Mn—O perovskite (LSM) and combinations thereof, but it may contain up to 5 wt % of these.

Preferably, the content of $SiO_2$, $Al_2O_3$, CaO and MgO represents 85 to 97 wt %, preferably 85 to 95 wt % or 87 to 97 wt % of the glass sealant composition, while the content of $Na_2O+K_2O$ and $B_2O_3$ represents 0 to 12 wt % of the glass sealant composition, and functional elements selected from $TiO_2$, $F_2$, $ZrO_2$, $P_2O_5$, $MoO_3$, $Fe_2O_3$, $MnO_2$ and La—Sr—Mn—O perovskite (LSM) and combinations thereof represent 0 to 5 wt %.

As such, the invention encompasses therefore the use of glass with a composition of 50 to 70 wt % $SiO_2$, 0 to 20 wt % $Al_2O_3$, 10 to 50 wt % CaO, 0 to 10 wt % MgO, 0 to 2 wt % ($Na_2O+K_2O$), 5-10 wt % $B_2O_3$, and 0 to 5 wt % of functional elements selected from $TiO_2$, $ZrO_2$, $F_2$, $P_2O_5$, $MoO_3$, $Fe_2O_3$, $MnO_2$, La—Sr—Mn—O perovskite (LSM) and combinations thereof, as glass sealant in solid oxide electrolysis cell stacks.

In a particular embodiment of the invention the glass sealant is a glass with a composition of: 52 to 56 wt % $SiO_2$, 12 to 16 wt % $Al_2O_3$, 16 to 25 wt % CaO, 0 to 6 wt % MgO, 0 to 2 wt % $Na_2O+K_2O$, 0 to 10 wt % $B_2O_3$, 0 to 1.5 wt % $TiO_2$, 0 to 1 wt % $F_2$. This glass composition corresponds to the composition of E-glass and shows a thermal expansion coefficient of about $5.4 \cdot 10^{-6}$ K$^{-1}$ from $-30$ to 250° C. The TEC of interconnector plates is usually 12 to $13 \cdot 10^{-6}$K$^{-1}$ and for interconnector plates made of Inconnel 600 containing 18 wt % Cr, 8 wt % Fe with Ni as balance, the TEC may be as high as $17 \cdot 10^{-6}$ K$^{-1}$.

Another preferred glass sealant is E-glass with a composition of 52 to 62 wt % $SiO_2$, 10 to 15 wt % $Al_2O_3$, 18 to 25 wt % CaO, 0.5 to 4 wt % MgO, 0.25 to 2 wt % $Na_2O$, 3.5 to 5 wt % $B_2O_3$, which corresponds to a low boron E-glass as described in U.S. Pat. No. 7,022,634. The invention encompasses also the use of an E-glass having this composition as glass sealant in SOEC stacks.

Yet another preferred glass sealant is E-glass with a composition of 52 to 54 wt % $SiO_2$, 12 to 14 wt % $Al_2O_3$, 16 to 23 wt % CaO, 0 to 3 wt % MgO, 0 to 0.2 wt % ($Na_2O+K_2O$), 8 to 10 wt % $B_2O_3$, 0 to 0.8 wt % $Fe_2O_3$, 0 to 1.5 wt % $TiO_2$, 0 to 1 wt % $F_2$ where the composition further comprises 0 to 3 wt % $Li_2O$ and 0 to 4 wt % ZnO. This composition corresponds to E-glass as disclosed in WO-A-08112978 and enables a significant reduction of the manufacturing costs during the preparation of E-glass fibres. The invention encompasses also the use of an E-glass having this composition as glass sealant in SOEC stacks.

Another preferred E-glass composition is 55.11 wt % $SiO_2$, 15.85 wt % CaO, 4.20 wt % MgO, 15.34 wt % $Al_2O_3$, 8.80 wt % $B_2O_3$, 0.39 wt % $Na_2O$, and 0.31 wt % $K_2O$. Yet another suitable E-glass composition is 55.50 wt % $SiO_2$, 19.80 wt % CaO, 1.80 wt % MgO, 14.00 wt % $Al_2O_3$, 8.00 wt % $B_2O_3$, 0.90 wt % $Na_2O$.

We have found that despite the significantly lower TEC of the sealing material in the first cell stack assembly of step (a), it is possible to prepare a final fuel cell stack in which the TEC of the components including the sealant work well together without creation of leakages during ordinary operation and thermal cycling. It appears that the sealant is kept under compression during the cooling step (c) due to the larger contraction in the interconnector plate and the cell during this stage. A calculation based on an elastic fracture mechanical model which takes into consideration the non-linearity of the thermal expansion coefficient using a TEC of $13.3 \cdot 10^{-6}$ K$^{-1}$ (RT-700° C.) for the interconnect plates and the cells, and $6 \cdot 10^{-6}$ K$^{-1}$ for a glass sealant according to the invention with a thickness of 11 to 33 µm and forming 10% of the stack shows that the maximum energy release rate for the glass layers is 20 J/m$^2$ which is close to the maximum release rate of the cell (18 J/m$^2$). Hence, no cracking of the cells takes place due to the formation of the very thin glass sealant, i.e. 5 to 100 µm and in this particular case 11 to 33 µm.

In the heating step (b) the first fuel cell stack assembly is more preferably heated to 850 to 900° C. and maintained at this temperature for hold times of 2 to 6 hours. At these hold times and even after about 10 hours no significant crystallization of the sealant occurs. However, after a prolonged heating, for instance after about 84 hours at 850° C., a crystallization takes place, and the TEC of the sealant surprisingly increases up to $10 \cdot 10^{-6}$ $K^{-1}$ as measured in the range 25 to 800° C.

The glass sealant may or may not crystallize during the heating step (b) depending on the temperature and hold time used. Crystallization is inevitable during operation over more than 100 hours at any temperature equal to or above 800° C. For instance, after 168 hours of heat treatment at 800° C. crystallisation of the sealant takes place in a composition similar to that obtained at 850° C. for a hold time of 84 hours, resulting in a TEC up to $10 \cdot 10^{-6}$ $K^{-1}$ as measured in the range 25 to 800° C. Particularly when using a sealant having E-glass composition as recited above, the crystallizing phase of the sealant is diopside ranging in composition from diopside to wollastonite, anorthite and cristobalite, while the $B_2O_3$ may stay in the glass phase. When MgO is present in the glass diopside $(CaMg)Si_2O_6$ may crystallize as the first fase. The pseudowollastonite/wollastonite $(CaSiO_3)$ crystallizes around the diopside core. Anorthite $CaAl_2Si_2O_8$ forms a solid solution series with albite, $NaAlSi_3O_8$, when $Na_2O$ is present in the melt. A limited amount of $K_2O$ may also be included. The unexpectedly high TEC in the crystallized sealant appears to be the result of the formation of the diopside-wollastonite (TEC about $8 \cdot 10^{-6}$ $K^{-1}$) and cristobalite (TEC about $20 \cdot 10^{-6} K^{-1}$), which counteracts the presence of the low TEC anorthite (TEC about $5 \cdot 10^{-6} K^{-1}$).

The crystallized sealant imposes less tensile force onto the ceramic cell and thus reduces the risk of crack formation. Accordingly, the sealant has an improved match with the rest of the cell, particularly the interconnect (interconnect plate), and the risk for cell cracking during thermal cycling is further suppressed.

In order to ensure a fast crystallization of the sealant, nucleation elements such as Pt, $F_2$, $TiO_2$, $ZrO_2$, $MoO_3$, LSM and $Fe_2O_3$ can be added.

The sealant is poor in alkali components given by the sum $Na_2O+K_2O$, and is free of BaO. Usually, a low ($\leq 2$ wt %) alkali content of the sealant ensures a low electrical conductivity. Furthermore, alkali elements in significant amounts are corrosive to the Cr-rich oxide scale of interconnects made of chromium based alloys by forming $Na_2CrO_4$ having a melting point of 792° C., $K_2CrO_4$ having a melting point of 976° C., or $(Na,K)_2CrO_4$ with a minimum melting point of 752° C. These components become mobile at 800° C. and electrically conductive when operating at this temperature. The alkaline earth BaO used in the prior art to increase the TEC may also be corrosive to the Cr-oxide scale forming $BaCrO_4$ which may generate detachment cracks.

In yet another embodiment, in combination with the above or below embodiments, the sealant in step (a) is loaded with filler material in the form of MgO, steel-powder, quartz, leucite and combinations thereof. The high TEC of the filler material renders it possible to obtain a composite glass sealant with a TEC corresponding to that of the interconnect plate i.e. $12-13 \cdot 10^{-6}$ $K^{-1}$.

In a further embodiment, the glass sealant is a paste formed by mixing a glass powder having the composition according to the present invention with a binder and an organic solvent. The paste is used for screen printing or as a paste to be used in a dispenser for making a sealant.

The glass powder may be mixed with a filler in the form of MgO, steel-powder, quartz, leucite and combinations thereof in order to produce a glass having TEC of $12-13 \cdot 10^{-6}$ $K^{-1}$. Once again and regardless of whether the glass is provided as a sheet of glass fibres or as a paste, it is possible by the invention to convert the starting glass fibre material into a thin glass sealant, i.e. of 5 to 100 µm, often 5 to 50 µm, preferably 11 to 33 µm, in the final cell stack which is dense and thereby gas-tight, i.e. hermetic. This is highly desirable since a hermetic sealant serves to prevent the mixing of the produced hydrogen on one electrode and produced oxygen and air on the other electrode in adjacent cell units. The hermeticity appears to be the result of a complete coalescence between the individual fibres squeezed together by the load exerted on the cell stack during the heating step (b) and the use of a temperature during this step which often is at least equal to the softening point of the glass sealant (viz. above about 800° C.). A closed pore structure or a dense glass is thereby obtained. The relatively high softening temperature of the sealant (above about 800° C.) enables the sealant to maintain a high viscosity, such as $10^9$-$10^{11}$ Pa-s at the operating temperatures of the fuel cell stack, for instance at 750 to 800° C.

The invention encompasses also the use of E-glass with a composition of 52 to 56 wt % $SiO_2$, 12 to 16 wt % $Al_2O_3$, 16 to 25 wt % CaO, 0 to 6 wt % MgO, 0 to 2 wt % $Na_2O+K_2O$, 0 to 10 wt % $B_2O_3$, 0 to 1.5 wt % $TiO_2$, 0 to 1 wt % F as glass sealant in solid oxide electrolysis stacks, wherein the glass is provided as a sheet of glass fibres and wherein the sheet of glass fibres contains fibres in an amount of 70 to 100 $g/m^2$ towards the cell and 30 to 60 $g/m^2$ towards the interconnect plate.

The invention encompasses also the use of an E-glass having a composition according to the invention as a glass sealant in solid oxide electrolysis stacks, in which the glass is provided as a sheet of glass fibers, wherein the composition further comprises 0 to 3 wt % $Li_2O$ and 0 to 4 wt % ZnO.

The FIGURE shows the average cell voltage during operation of a SOEC stack prepared according to Example 1.

EXAMPLE 1

A 300 µm thick anode supported cell with internal feeding and exhaust holes has demasked contact layers in the manifold areas in order to minimise the leakage through these porous structures. A metal gasket frame covered with equally shaped, punched E-glass fibre paper having a composition according to the invention (e.g. ASTM D578-05: 52 to 62 wt % $SiO_2$, 12 to 16 wt % $Al_2O_3$, 16 to 25 wt % CaO, 0 to 5 wt % MgO, 0 to 2 wt % $Na_2O+K_2O$, 0 to 10 wt % $B_2O_3$, 0 to 1.5 wt % $TiO_2$, $Fe_2O_3$ 0.05 to 0.8 wt % and 0-1 wt % fluoride) on both sides is placed on both sides of the cell in such a way that air from the manifold holes is allowed to pass over one electrode (air side), and such that steam gas is allowed to pass over the other electrode (steam side) of the cell. Above and below the cell and gasket assemblage, an interconnect plate with manifold holes is placed. The E-glass paper contains fibres in an amount of 100 $g/m^2$ towards the cell and 50 $g/m^2$ towards the interconnect plate corresponding to a 40 and 20 µm, respectively, thick dense layer after treatment according to the invention at temperatures of about 880° C. and a load pressure of about 6 $kg/cm^2$. Building a stack with 5 cells, a cross-over leak between the anode and the cathode sides has been measured at RT to as low as 0.05 and 0.09% in two stacks after a full thermal cycle. With gas chromatography using steps of 2×$N_2$ concentration in oxygen on the air side and measuring the $N_2$ mole concentration on the steam side during operation with the same gas pressure on the steam and oxygen/air side, we obtained a doubling of the $N_2$ mole % in the anode of each step showing that the there is a leakage and that it is diffusion driven, presumably due to the diffusion through the porous structures of the cell (mainly the anode support). An increasing of the gas pressure on the oxygen side had no effect on the cross-over leak on the steam side.

XRD-spectres of the E-glass show the presence of wollastonite, $CaSiO_3$ (diopside, (Ca,Mg) $SiO_3$ also fit the spectrum and its presence depends on the MgO-content of the glass) together with anorthite ($CaAl_2Si_2O_8$, which may contain up to 10 mole % $NaAlSi_3O_8$) and cristobalite, ($SiO_2$).

The flat profile of the FIGURE shows that the SOEC does not degrade significantly during operation. In the electrolysis mode at 850° C., −0.5 A/cm$^2$ 45% $H_2O$-45$CO_2$-10% $H_2$ the solid oxide cell stack has operated with a degradation as low as 1%/1000 hours between 30 to 800 hours. At 0.75 A/cm the overall voltage increase seems to level out before the stack test was stopped due to a system failure. The degradation rate is low compared to literature where degradation rates of 2%/1000 or more in high temperature operation of SOECs are normal. For instance, degradation rates of 2%/1000 hours at 850° C., p(H2O)/p(H2)=0.5/0.5 and −0.5 A/cm$^2$ and 6%/1000 hours at 950° C. p(H2O)/p(H2)=0.1/0.9 and −1.0 A/cm$^2$ have been reported in literature. Normally the degradation has been attributed to the delamination of the $O_2$ electrode, Cr-contamination, as well as contamination of the $H_2$-electrode's triple phase boundary by silica. The silica could also originate from the interconnect plate. In the present case the low degradation of 1%/1000 hours, compared to e.g. 2%/1000 hours or more of prior art SOECs indicates that the E-glass seal does not significantly contaminate the electrodes of the cell over 800 hours. Without being bound by any theory the reason for this appears to be that the E-glass seal was crystallized to a stable assemblage of $MgCaSi_2O_6$, $CaSiO_3$, $CaAl_2Si_2O_8$ and $SiO_2$ (cristobalite) with a reduced area of exposed $(SiO_4)^{4-}$ units compared to the albite glass. Also a smaller exposed surface due to the design of the stack with very thin layers of sealing glass. Some preliminary results from another stack operating in electrolysis mode at 0.65 A/cm$^2$ show no degradation so it is unknown to what extent the degradation of 1%/1000 hours is driven by Si or Cr-contamination.

Therefore the invention enables to prepare by simple means (use of E-glass fibre paper as glass sealant precursor) a final cell stack in which the components of the stack including the sealant work well together without creating leakages during ordinary operation and thermal cycling. No deteriorating reactions occur between the oxide scale of the interconnect and the E-glass.

The invention claimed is:
1. Solid oxide electrolysis cell (SOEC) stack, comprising:
a first cell stack assembly comprising at least one interconnector plate alternating with at least one cell unit, in which each cell unit comprises a first electrode, a second electrode and an electrolyte arranged between these electrodes, and a glass fibre sealant sheet disposed in between the interconnector plate and each cell unit, in which the glass sealant is an E-glass and is a barium oxide free composition which contains: 52-62 wt % $SiO_2$, 10-15 wt % $Al_2O_3$, 18-25 wt % CaO, 0.5-4 wt % MgO, $Na_2O$, $K_2O$, both $Na_2O$ and $K_2O$ being present in a combined amount of 0.25-2 wt %, 3.5 wt % $B_2O_3$, and 0-5 wt % of functional elements selected from $TiO_2$, $ZrO_2$, $F_2$, $P_2O_5$, $MoO_3$, $Fe_2O_3$, $MnO_2$, La—Sr-M perovskite (LSM) and combinations thereof;
said first cell stack assembly converted into a second assembly having a glass sealant of thickness between 5 and 100 μm by heating said first assembly to a heating temperature of 500° C. or higher and subjecting the cell stack to a load pressure of 2-20 kg/cm$^2$; and
said second assembly converted into a final solid oxide electrolysis cell stack assembly by cooling the second assembly to a temperature below the heating temperature, the SOEC exhibiting a degradation rate of about 1%/1000 hours.

2. Solid oxide electrolysis cell stack according to claim 1 wherein the heating temperature is 800° C. or higher and the load pressure is 2-10 kg/cm$^2$, and results in a glass sealant of thickness between 5 and about 50 μm.

3. Solid oxide electrolysis cell stack according to claim 1, wherein the content of $SiO_2$, $Al_2O_3$, CaO and MgO represents 85-95 wt % or 87-97 wt % of the glass sealant composition, the content of $Na_2O$+$K_2O$ and $B_2O_3$ represents 3.75 to 5.5 wt % of the glass sealant composition and functional elements selected from $TiO_2$, $F_2$, $ZrO_2$, $P_2O_5$, $MoO_3$, $Fe_2O_3$, $MnO_2$ and La—Sr—Mn—O perovskite (LSM) and combinations thereof represent 0-5 wt %.

4. Solid oxide electrolysis cell stack according to claim 1, wherein the glass sealant is loaded with filler material in the form of MgO, steel-powder, quartz, leucite and combinations thereof.

* * * * *